United States Patent [19]

Johnson

[11] Patent Number: 5,657,425

[45] Date of Patent: Aug. 12, 1997

[54] LOCATION DEPENDENT VERBAL COMMAND EXECUTION IN A COMPUTER BASED CONTROL SYSTEM

[75] Inventor: William J. Johnson, Flower Mound, Tex.

[73] Assignee: International Business Machines Corporation, Armonk, N.Y.

[21] Appl. No.: 152,751

[22] Filed: Nov. 15, 1993

[51] Int. Cl.⁶ ........................................................ G10L 5/06
[52] U.S. Cl. .................................................... 395/2.84
[58] Field of Search ............................ 381/43; 395/2.4, 395/2.79, 2.8, 2.81, 2.83, 2.84

[56] References Cited

U.S. PATENT DOCUMENTS

| | | | |
|---|---|---|---|
| 3,601,530 | 8/1971 | Edson et al. | 348/15 |
| 4,385,359 | 5/1983 | Watari et al. | 395/2.4 |
| 5,086,385 | 2/1992 | Launey et al. | 364/188 |
| 5,214,707 | 5/1993 | Fujimoto et al. | 381/43 |
| 5,255,305 | 10/1993 | Sattar | 379/34 |
| 5,255,326 | 10/1993 | Stevenson | 381/110 |

FOREIGN PATENT DOCUMENTS 40 29 717 A1  of 0000  Germany .

*Primary Examiner*—Allen R. MacDonald
*Assistant Examiner*—Robert C. Mattson
*Attorney, Agent, or Firm*—Edward Duffield; Andrew J. Dillon

[57] ABSTRACT

A method and system for location dependent verbal command execution in a computer based control system within an installation having multiple physical locations. A specified function within each physical location, such as a lighting fixture or alarm setting, may be controlled by a selected verbal command. A microphone within each room or physical location within the installation is utilized to detect each utterance of a verbal command and the volume of each verbal command is determined for each physical location at which that command is detected. Thereafter, the physical location having the highest volume for a detected verbal command is identified and the specified function is controlled at only that location. In the event multiple speakers simultaneously utter a verbal command at different physical locations, the location of maximum volume is determined for each speaker and the specified function is controlled at only the maximum volume location associated with each speaker. In this manner, a single verbal command may be utilized to control an identical function at multiple locations within an installation in a location dependent manner.

8 Claims, 3 Drawing Sheets ved utilizing verbal commands. Still more particularly,
the present invention relates to a method and system for
location dependent verbal command execution in a com-
puter based control system.

LOCATION DEPENDENT VERBAL COMMAND EXECUTION IN A COMPUTER BASED CONTROL SYSTEM

BACKGROUND OF THE INVENTION

1. Technical Field

The present invention relates in general to an improved
computer based control system and in particular to an
improved computer based control system which may be
operated utilizing verbal commands. Still more particularly,
the present invention relates to a method and system for
location dependent verbal command execution in a com-
puter based control system.

2. Description of the Related Art

Computers are becoming increasingly ubiquitous in the
modern world. The introduction of the so-called "personal"
computer has greatly enhanced the availability of computing
power to the ordinary consumer. As these computers become
more commonplace a greater number of applications for this
computing power is available to the consumer.

For example, in addition to word processing, mathemati-
cal calculation and computer aided drafting or manufactur-
ing applications personal computers are increasingly utilized
to control various functions in the modern household. In an
effort to make such devices increasingly "user friendly" the
interface between the user and the computer has been
rapidly developing in many areas.

One technique for decreasing the complexity of the inter-
face between a user and a computer is the utilization of
interface techniques which are intuitive and easily under-
stood by those who are not skilled in the computer arts.
Intuitive interfaces, such as a graphical user interface or a
verbal command interface are becoming increasingly com-
mon. For example, speech recognition software now exists
which makes it possible for a computer system to be
"trained" to recognize selected words or phrases. One
example of this technology is presently available within
cellular telephones installed within automobiles. A user may,
utilizing verbal commands, automatically dial a particular
location or specified number without requiring manual input
of that data to the cellular telephone system, greatly enhanc-
ing system efficiency and user safety while driving an
automobile.

In a similar application, the utilization of a computer for
the creation of a so-called "smart house" has also been
proposed in conjunction with a verbal command interface;
however, the number of locations and functions to be
controlled utilizing a computer in such an application is
somewhat greater than the functions typically present within
a telephone system or other simple application. A computer
based control system implemented within a "smart house"
will allow appliances and electrical systems, such as lighting
or alarm systems to be operated by voice control.

Known voice control systems require a unique command
for each unique function and thus such a system requires a
different command to operate a similar function in different
areas within the house or installation area. For example, a
unique command is required to operate the lighting fixture
within one bedroom of a house and a separate unique
command would be required to operate the lighting system
within another bedroom in the house. This requirement
results in an increased complexity due to the fact that the
system must be trained to recognize a larger number of
verbal commands and thus the system memory requirements
and processing complexity are greatly increased.

It should therefore be apparent that it would be advanta-
geous to provide a computer based control system which
utilizes verbal commands in a location dependent manner.

SUMMARY OF THE INVENTION

It is therefore one object of the present invention to
provide an improved computer based control system.

It is another object of the present invention to provide an
improved computer based control system which may be
operated utilizing verbal commands.

It is yet another object of the present invention to provide
an improved method and system for location dependent
verbal command execution within a computer based control
system.

The foregoing objects are achieved as is now described.
A method and system are disclosed for location dependent
verbal command execution in a computer based control
system within an installation having multiple physical loca-
tions. A specified function within each physical location,
such as a lighting fixture or alarm setting, may be controlled
by a selected verbal command. A microphone within each
room or physical location within the installation is utilized
to detect each utterance of a verbal command and the
volume of each verbal command is determined for each
physical location at which that command is detected.
Thereafter, the physical location having the highest volume
for a detected verbal command is identified and the specified
function is controlled at only that location. In the event
multiple speakers simultaneously utter an identical verbal
command at different physical locations, the location of
maximum volume is determined for each speaker and the
specified function is controlled at only the maximum volume
location associated with each speaker. In this manner, a
single verbal command may be utilized to control an iden-
tical function at multiple locations within an installation in
a location dependent manner.

The above as well as additional objectives, features, and
advantages of the present invention will become apparent in
the following detailed written description.

BRIEF DESCRIPTION OF THE DRAWINGS

The novel features believed characteristic of the invention
are set forth in the appended claims. The invention itself,
however, as well as a preferred mode of use, further objec-
tives and advantages thereof, will best be understood by
reference to the following detailed description of an illus-
trative embodiment when read in conjunction with the
accompanying drawings, wherein:

DETAILED DESCRIPTION OF PREFERRED EMBODIMENT

Figure 1:
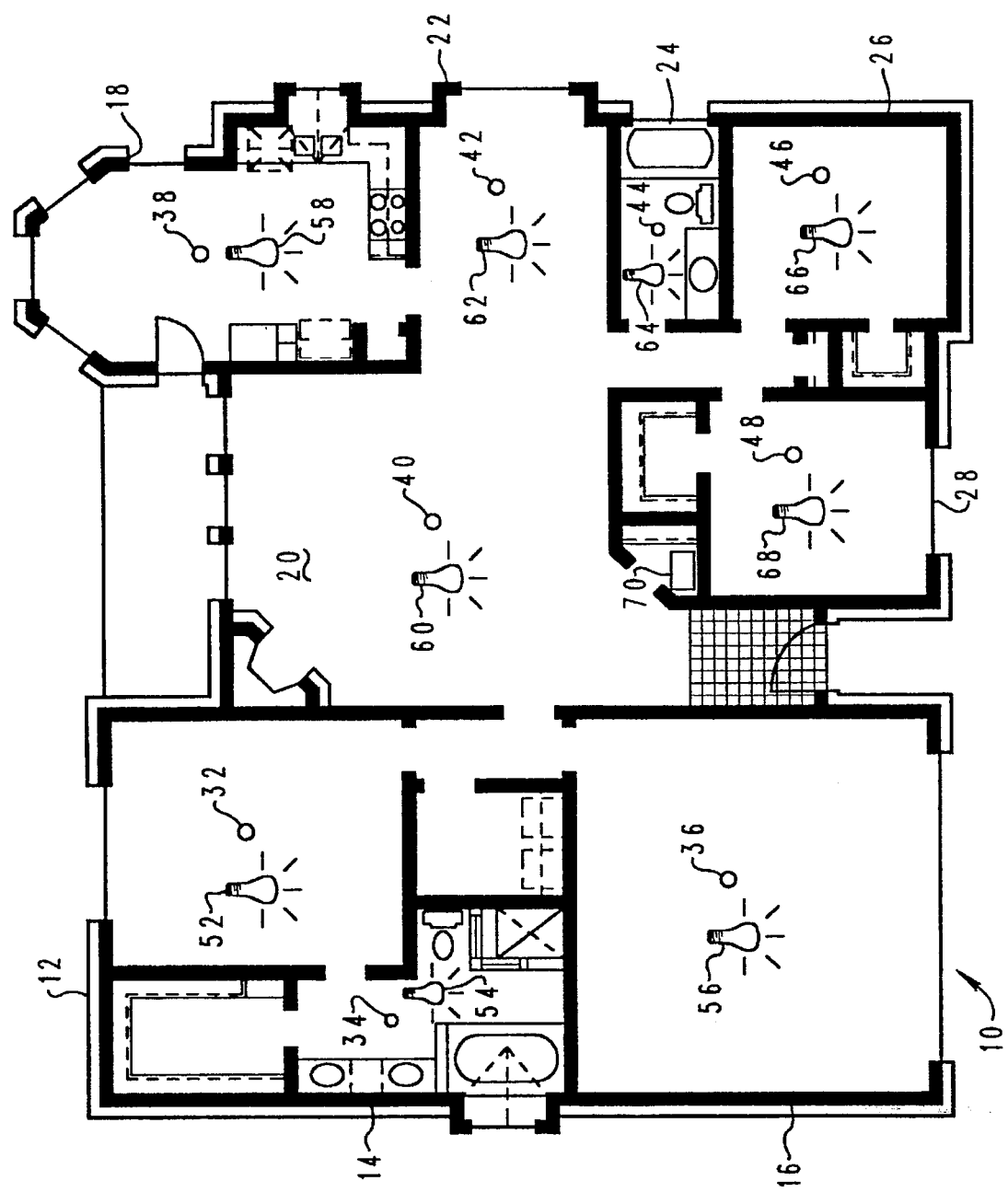
FIG. 1 is a pictorial representation of a computer based
control system installed within a house in accordance with
the method and system of the present invention.

With reference now to the figures and in particular with
reference to FIG. 1, there is depicted a pictorial represen-
tation of a computer based control system installed within a
house 10 in accordance with the method and system of the
present invention. As illustrated, house 10 may comprise a substantial number of rooms or separate physical locations such as rooms 12, 14, 16, 18, 20, 22, 24, 26, and 28. Located at a central location within each of these rooms is a verbal command detection device, such as a microphone. Thus, microphone 32 is located within room 12. Microphone 34 is located within room 14 and each room recited above includes a corresponding microphone which may be utilized to detect verbal commands uttered within that physical location.

For purposes of illustration, a lighting fixture is illustrated within each room or physical location within house 10. Thus, lighting fixture 52 is located within room 12. Similarly, lighting fixture 56 is located within room 16, lighting fixture 62 is located within room 22 and lighting fixture 68 is located within room 28. Of course, those skilled in the art will appreciate that while a lighting fixture is utilized to illustrate the control of a specified function by the computer based control system of the present invention, alarm systems, appliances or other similar functions may also be controlled utilizing the method and system of the present invention without departing substantially from the spirit and intent of this disclosure.

Located at a central location within house 10 is a computer 70. Computer 70 may be implemented utilizing any suitable computer, such as a so-called "personal" computer, such as the Personal System/2 computer manufactured by International Business Machines Corporation of Armonk, N.Y.

As will be illustrated herein, a function control bus will be provided between computer 70 and each specified function to be controlled utilizing the computer based control system of the present invention. Those skilled in the art will appreciate that the function control bus may constitute a so-called "hard-wired" bus or a series of radio frequency receivers disposed at each specified function location which are capable of being operated remotely by a radio frequency transmitter provided in association with computer 70. Additionally, circuitry coupling the output of each microphone within house 10 to personal computer 70 will be provided in a manner which will be described in greater detail herein and which is not illustrated within FIG. 1.

Figure 2:
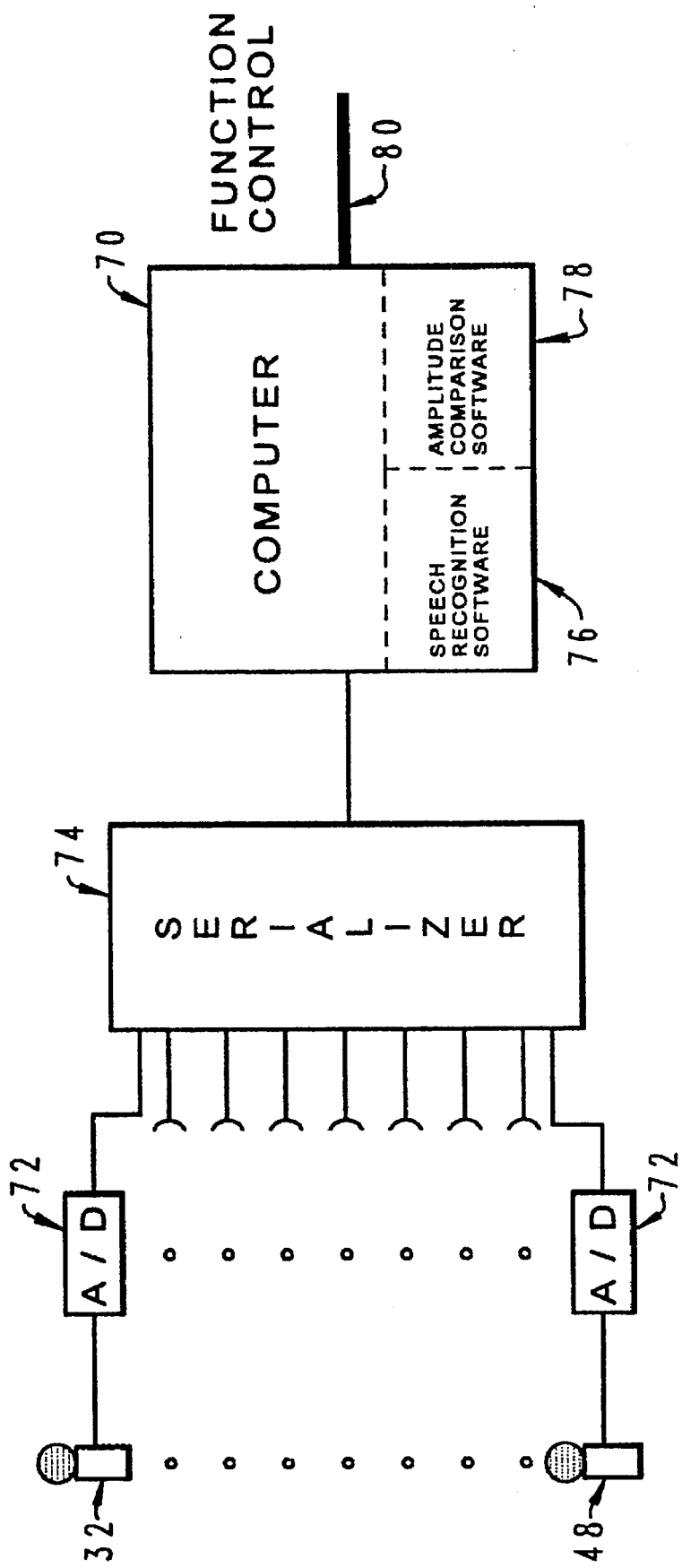
FIG. 2 is a high level block diagram depicting the major
components of the computer based control system of the
present invention.

Referring now to FIG. 2 there is depicted a high level block diagram which illustrates the major components of the computer-based control system of the present invention. As illustrated, each microphone 32–48 is preferably coupled to an analog-to-digital converter 72. Of course, those skilled in the art will appreciate upon reference to the present specification that conversion to digital format may not be necessary; however, the manipulation of digital values within a personal computer presents various advantages.

Next, the output of each analog-to-digital converter 72 is coupled to serializer 74. Serializer 74 may be provided utilizing any suitable circuit capable of arranging the outputs of each analog-to-digital converter 72 into a format suitable for coupling to computer 70. Additionally, in the depicted embodiment of the present invention, serializer 74 will preferably provide a time stamp value to be associated with each output of an analog-to-digital converter 72, in order to determine whether or not a plurality of verbal commands detected utilizing microphones 32–48 are uttered in a substantially simultaneous manner, indicating that a single spoken utterance has been detected at multiple microphones. Of course, those skilled in the art will appreciate that upon the coupling of each output of an analog-to-digital converter 72 to computer 70 via serializer 74, slight differences in time will necessarily occur; however, it is contemplated that any spoken utterance which occurs within several milliseconds of another detected spoken utterance may be considered to be a simultaneous utterance for purposes of this invention.

Next, computer 70 analyzes the output of each analog-to-digital converter 72 in comparison with previously stored verbal command templates, which are utilized to determine whether or not a verbal command detected at a microphone 32–48 is recognized as a verbal command for which this system has been trained. Again, those skilled in the speech recognition art will appreciate that the creation of training templates containing those verbal commands which are to be recognized by a computer based control system which utilizes verbal commands is a simple matter and merely comprises the generation of multiple templates for each verbal command, the averaging of those templates to achieve a nominal value and the specifying of variances which will be permitted from that nominal template.

Next, after determining that a verbal command detected at microphones 32–48 is a recognizable verbal command, computer 70 may also be utilized to determine whether or not the detected verbal command includes utterances by more than one speaker. It is contemplated that two speakers in separate areas within house 10 may utter a similar verbal command substantially simultaneously and thus it is important to determine whether or not multiple speakers have generated the detected verbal command. Again, those skilled in the speech recognition art will realize that the detection of multiple speakers in such a system is simply a matter of determining whether or not the speech recognition template utilized to recognize a particular verbal command is identical to a speech recognition template utilized to recognize a verbal command from a second speaker at a second location. Additionally, in systems which utilize a single generic template for the recognition of verbal commands, there are sufficient audible differences between individual speakers that the existence of multiple speakers may be easily accomplished.

Next, in accordance with an important feature of the present invention, amplitude comparison 78 is performed within computer 70 to determine the physical location of each verbal command detected at microphones 32–48 which possesses the maximum volume for a particular verbal command. That is, the single physical location detecting the greatest volume of a verbal command, in the case of a single speaker, or the location having the maximum volume associated with each individual speaker, in the event multiple speakers simultaneously utter a verbal command. Thereafter, a control signal is output via function control bus 80 to control a specified function over a wired bus or radio frequency link, as described above.

Thus, in accordance with the method and system of the present invention, a verbal command detected within the system will be analyzed to determine the physical location at which the maximum volume occurs and computer 70 will thereafter control the specified function associated with that verbal command at only that location. In this manner, the simple command "LIGHTS ON" may be utilized to control a lighting fixture within any room within house 10, without requiring the verbal specification of particular lighting fixtures and without requiring the increased complexity that nonlocation dependent interpretation of verbal commands engenders.

Figure 3:
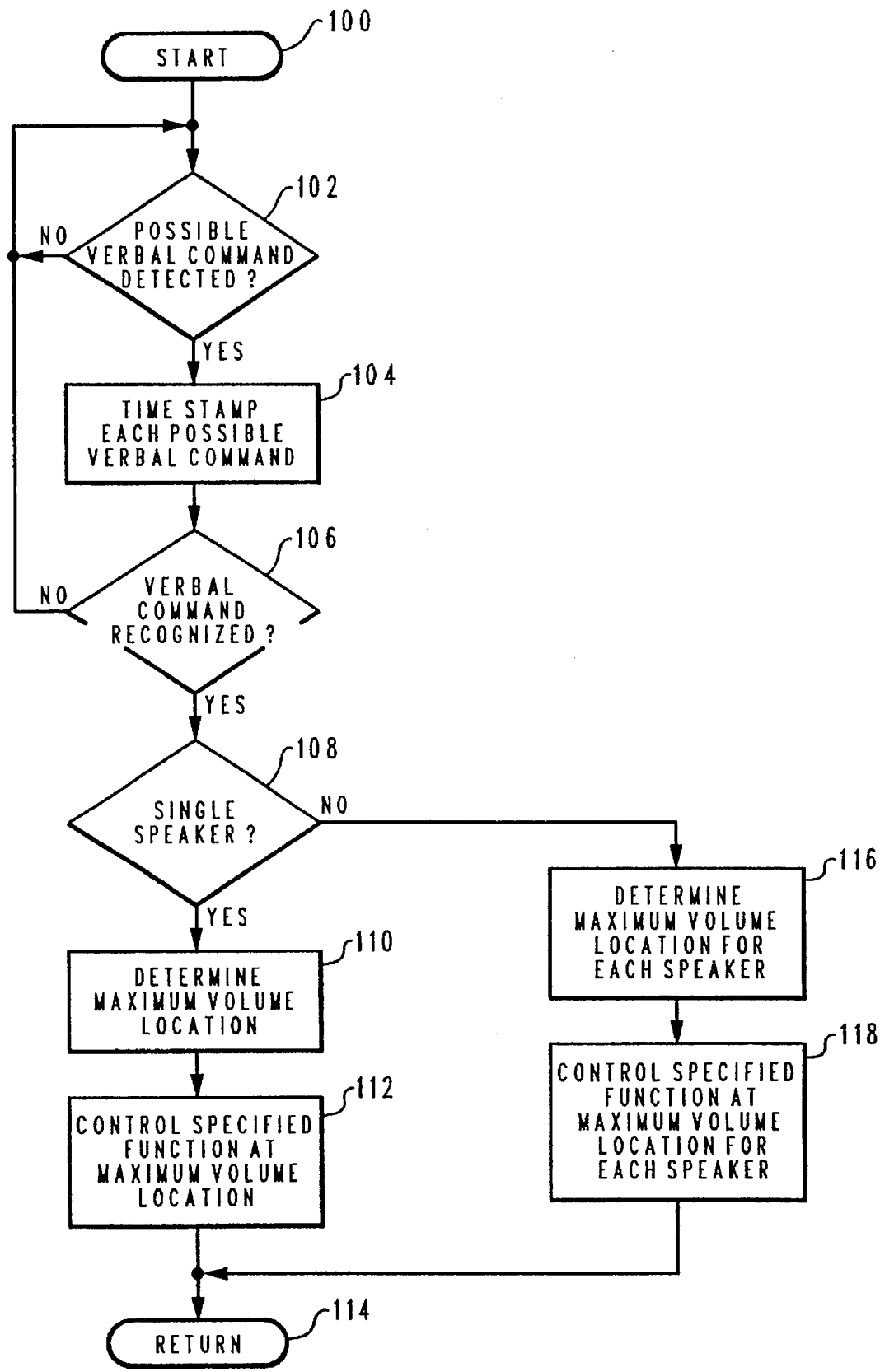
FIG. 3 is a high level logic flowchart which illustrates a
process for implementing the method and system of the
present invention within a computer.

Finally, referring to FIG. 3, there is depicted a high level logic flowchart which illustrates a process for implementing the method and system of the present invention within a computer. As depicted, the process begins at block 100 and thereafter passes to block 102. Block 102 illustrates a determination of whether or not a possible verbal command has been detected and if not, the system merely iterates until such time as a possible verbal command is detected. Once a verbal command has been detected, the process passes to block 104.

Block 104 illustrates the time stamping of each possible verbal command for determination of whether or not a series of detected verbal commands are to be considered substantially simultaneous, for purposes of interpretation. Thereafter, the process passes to block 106. Block 106 illustrates a determination of whether or not the verbal command detected is recognized as an appropriate verbal command for the computer based control system of the present invention. If not, the process returns, in an iterative fashion, to block 102 to await the occurrence of a subsequent possible verbal command.

Still referring to block 106, in the event a verbal command has been recognized, the process passes to block 108. Block 108 illustrates a determination of whether or not the recognized verbal command is a single command from a single speaker. As described above, this may be accomplished by determining that multiple recognition templates have been identified as corresponding to various detected verbal commands within a single utterance or, in the event of a speech recognition process which is speaker independent, by recognizing various differences in the output of multiple analog-to-digital converters 72. In the event the verbal command recognized is the utterance of a single speaker, the process then passes to block 110.

Block 110 illustrates a determination of the maximum volume location for the verbal command. Of course, this may be simply and efficiently accomplished by comparing the maximum digital value which occurred during a group of substantially simultaneous verbal commands. Thereafter, the process passes to block 112 which illustrates the control of the specified function at only the maximum volume location. The process then passes to block 114 and returns.

Referring again to block 108, in the event a determination is made that multiple speakers have substantially simultaneously uttered a single command, the process passes to block 116. Block 116 illustrates the determination of the maximum volume location for each identified speaker and the process then passes to block 118. Block 118 illustrates the control of the specified function at each maximum volume location associated with a particular speaker and the process then passes to block 114 and returns.

Upon reference to the foregoing, those skilled in the art will appreciate that the Applicant herein has provided a simple and efficient technique for implementing a location dependent verbal command execution system within a computer based control system. By detecting each possible verbal command at multiple physical locations throughout the installation and thereafter controlling a specified function at only the physical location having the greatest detected volume, the method and system of the present invention greatly decreases the complexity of a verbal command system while increasing the efficiency thereof.

While the invention has been particularly shown and described with reference to a preferred embodiment, it will be understood by those skilled in the art that various changes in form and detail may be made therein without departing from the spirit and scope of the invention.

I claim:

1. A method for location dependent utilization of verbal commands uttered by users in a computer based control system for controlling at least a specified function at each of a plurality of physical locations within an installation, said method comprising the steps of:

detecting a verbal command at each of said plurality of physical locations within said installation;

adding a time-stamp to each of said detected verbal commands; comparing said time-stamp for each of said detected verbal commands to determine a number of verbal commands which occur within a specified short period of time such that said number of verbal commands may be considered to have occurred substantially simultaneously;

determining whether or not said substantially simultaneous verbal commands are from a single speaker;

in response to a determination that said substantially simultaneous verbal commands are from a single speaker,
   identifying a physical location of said single speaker within said installation; and
   controlling said specified function at only said identified physical location;

in response to a determination that said substantially simultaneous verbal commands are not from a single speaker,
   identifying each physical location of each speaker within said installation; and
   controlling said specified function at each said identified physical location within said installation.

2. The method for location dependent utilization of verbal commands uttered by users in a computer based control system according to claim 1, wherein said identifying a physical location step further includes a step of determining a highest volume for said detected verbal command.

3. The method for location dependent utilization of verbal commands uttered by users in a computer based control system according to claim 2, wherein said identifying each physical location step further includes a step of determining a highest volume for said detected verbal command at each physical location.

4. A computer based control system for location dependent utilization of verbal commands uttered by users for controlling at least a specified function at each of a plurality of physical locations within an installation, said computer based control system comprising:

means for detecting a verbal command at each of said plurality of physical locations within said installation;

means for adding a time-stamp to each of said detected verbal commands;

means for comparing said time-stamp for each of said detected verbal commands to determine a number of verbal commands which occur within a specified short period of time such that said number of verbal commands may be considered to have occurred substantially simultaneously;

means for determining whether or not said substantially simultaneous verbal commands are from a single speaker;

in response to a determination that said substantially simultaneous verbal commands are from a single speaker, means for identifying a physical location of said single speaker within said installation; and means for controlling said specified function at only said identified physical location;

in response to a determination that said substantially simultaneous verbal commands are not from a single speaker, means for identifying each physical location of each speaker within said installation; and means for controlling said specified function at each said identified physical location within said installation.

5. The computer based control system for location dependent utilization of verbal commands uttered by users according to claim 4, wherein said means for identifying a physical location further includes a means for determining a highest volume for said detected verbal command.

6. The method for location dependent utilization of verbal commands uttered by users in a computer based control system according to claim 5, wherein said means for identifying each physical location further includes a means for determining a highest volume for said detected verbal command at each physical location.

7. The computer based control system for location dependent utilization of verbal commands uttered by users according to claim 4, wherein said means for detecting a verbal command at each of a plurality of physical locations within said installation comprises a microphone disposed within each of said plurality of physical locations within said installation.

8. The computer based control system for location dependent utilization of verbal commands uttered by users according to claim 7, further including an analog-to-digital converter coupled to each microphone disposed within each of said plurality of physical locations within said installation.

* * * * *